United States Patent Office 3,013,996
Patented Dec. 19, 1961

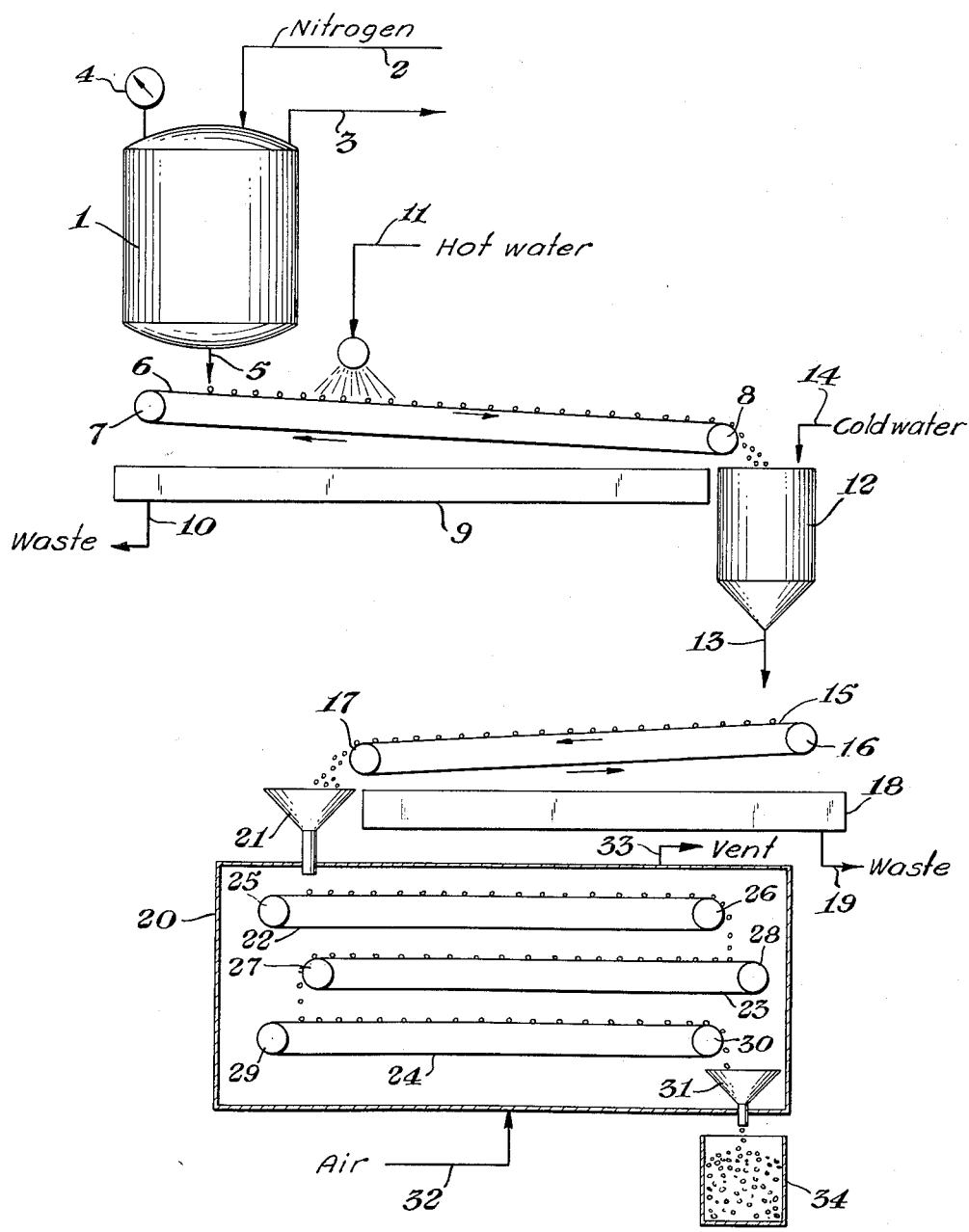

3,013,996
METHOD OF TREATING EXPANDABLE STYRENE POLYMER COMPOSITIONS
Eliza G. Pollard, Menlo Park, Calif., and Louis C. Rubens, Midland, Mich., assignors to The Dow Chemical Company, Midland, Mich., a corporation of Delaware
Filed June 2, 1960, Ser. No. 33,499
6 Claims. (Cl. 260—2.5)

This invention concerns a method of treating expandable styrene polymer compositions so as to produce when foamed cellular articles composed of uniform fine cells and low density.

Foamable styrene polymer granules or beads, e.g. polystyrene containing a volatile organic liquid such as pentane or petroleum ether dissolved therein, and methods of foaming such polymer beads to produce cellular articles are known. However, it is difficult to obtain cellular products of low density having a uniform cell size, suitably cells of 0.5 millimeter diameter or less, which in the case of foams consisting for the most part of individually-closed thin-walled cells, are foams possessing low thermal conductivity values and renders the foamed product eminently suitable for insulation purposes.

It has now been discovered that foamable styrene polymer particles, i.e. discrete particles of normally solid thermoplastic organic polymers having a volatile organic fluid dissolved or uniformly dispersed therein, in which the polymer is insoluble, which polymer consists of an appreciable proportion of styrene or a homologue or derivative thereof chemically combined or interpolymerized in the polymer molecule can readily be made to foam to a cellular product of low density and uniform fine cells by treating the foamable styrene polymer in the form of discrete particles prior to its being foamed by a series of successive steps which involves: (a) subjecting discrete particles of the thermoplastic styrene polymer containing the volatile organic fluid foaming agent dissolved therein to pressure of a gas such as nitrogen or air at from 200 to 2000 or more, preferably from 500 to 1500 pounds per square inch gauge pressure at temperatures of from 50° to 85° C. and for a time of from about 0.5 to 72 hours sufficient to allow the gas to diffuse substantially throughout the polymer particles; (b) cooling the impregnated polymer particles under pressure of said gas to a temperature of at least 25° C. or below; (c) releasing the pressure on the polymer particles to atmospheric pressure; (d) contacting said polymer particles, within a period of not more than 5 minutes after release of the pressure to atmospheric pressure with hot water at temperatures of from 90° to 100° C. at atmospheric pressure or thereabout for a time of not more than 30 seconds; then (e) contacting the polymer particles with a cold aqueous medium at a temperature of 25° C. or below to quickly cool said particles. Subsequent to the treating of the foamable styrene polymer particles as set forth in the combination of procedural steps (a)–(e) described above, the polymer particles can be foamed in known ways such as by heating a body of the treated particles in a porous mold with hot water or steam to produce cellular articles of low density and uniform fine cells.

It is important that the foamable styrene polymer particles be maintained under pressure of the nitrogen gas or air at a temperature of at least 50° C., preferably from 60° to 85° C., in order to obtain rapid diffusion of the gas throughout the polymer particles within a reasonable period of time, and that the time of treating under pressure of the gas be sufficient so that the gas diffuses substantially throughout the polymer particles, after which the polymer particles are cooled under pressure of said gas before release of the pressure to atmospheric pressure. It is also important that the gas impregnated polymer particles be contacted with hot water at temperatures of from about 90° to 100° C. within a period of not more than about five minutes after release of the gas pressure to atmospheric pressure and for a time of not more than about 30 seconds, after which the polymer particles are quickly cooled to about 25° C. or below in order to obtain the beneficial results of the invention. If such heating and cooling steps of the gas impregnated polymer particles are not carried out, or if such steps are carried out on the gas impregnated polymer particles at an appreciably later time than about five minutes after release of the gas pressure on the polymer particles to atmospheric pressure, the improvements of the invention are not obtained.

It appears that impregnating the foamable styrene polymer particles substantially throughout with the nitrogen gas or a gas consisting predominantly of nitrogen, which gas incidentally represents only a very minute proportion of the foaming agent, has an action of initiating the formation of cells upon subsequent foaming of the treated styrene polymer particles by heating the same to the softening point of the polymer or above. The cyclic treating of the cooled gas impregnated foamable styrene polymer particles, first with hot water at 90 to 100° C. for a time of not more than 30 seconds, then quickly cooling the particles to 25° C. or below, has an action of producing minute gas bubbles of the nitrogen or nitrogen-containing gas in the polymer particles so that upon expanding the polymer they serve as nuclei or initiation loci for the formation of cells, with the result that upon foaming there is obtained a cellular product of low density composed for the most part of individually-closed thin-walled fine cells of almost microscopic diameter.

The invention is illustrated more particularly with reference to the accompanying drawing showing a diagrammatic flow sheet illustrating an arrangement of apparatus suitable for practice of the invention.

In the drawing the numeral 1 indicates a polymerization vessel such as a steel, nickel, stainless steel, or a glass lined steel pressure resistant vessel equipped with a stirrer and means for heating or cooling, such as a jacket through which a heat transfer medium is passed or circulated. The vessel 1 is equipped with an inlet 2, a vent 3, a pressure gauge 4 and an outlet 5. The numeral 6 indicates an endless porous belt or screen moving over rolls 7 and 8. Below the screen belt 6 is an open vessel 9 having an outlet 10. Above screen belt 6 is a conduit 11 for feed of hot water thereonto. The numeral 12 indicates an open vessel, preferably equipped with a stirrer (not shown) and having an outlet 13 which can be a bottom outlet as shown or an overflow not shown. Above vessel 12 is a conduit 14 for feed of cold water thereto. Alternatively, cold water can be fed to vessel 12 through a bottom inlet (not shown) and overflowed therefrom through a lip (not shown). Beneath vessel 12 is an endless screen belt 15 moving over rolls 16 and 17. Under screen belt 15 is an open vessel 18 having an outlet 19. The numeral 20 indicates a dryer equipped with an inlet funnel 21 leading to moving endless belts 22, 23 and 24 driven by rolls 25, 26, 27, 28, 29 and 30 within dryer 20, and having a discharge funnel 31, and an inlet 32 and an outlet 33 for feed of air therethrough. Beneath dryer 20 and under discharge funnel 31 is a receiving vessel 34.

The invention is particularly applicable to the treating of granular or particulate normally solid thermoplastic styrene ploymers such as the homopolymers and copolymers of one or more monovinyl aromatic compounds having the general formula:

$$Ar-CH=CH_2$$

wherein Ar— represents a member of the group consisting of aromatic hydrocarbon and nuclear halogenated aromatic hydrocarbon radicals of the benzene series; copolymers of one or more of such monovinyl aromatic compounds with not more than 30 percent by weight of alpha-methyl styrene or acrylonitrile; copolymers of from 90 to 99 percent by weight of one or more of such monovinyl aromatic compounds and from 10 to 1 percent by weight of natural or a synthetic rubber, or mechanical blends of homopolymers and copolymers of the monovinyl aromatic compounds with from 1 to 10 percent of natural or a synthetic rubber, or mechanical blends of homopolymers and copolymers of the monovinyl aromatic compounds with from 1 to 10 percent of natural or a synthetic rubber; copolymers of one or more of the monovinyl aromatic compounds and methyl methacrylate; and copolymers of from 99.5 to 99.99 percent by weight of one or more of the monovinyl aromatic compounds and from 0.5 to 0.01 percent by weight of divinylbenzene. Suitable styrene polymers are polystyrene, polyvinyltolene, polyvinylxylene, copolymers of at least 70 percent by weight of styrene and not more than 30 percent of acrylonitrile or alpha-methyl styrene, copolymers of from 90 to 99 percent by weight of styrene and from 10 to 1 percent of natural rubber or a rubbery copolymer of butadiene and styrene, butadiene and acrylonitrile, butadiene, styrene and acrylonitrile, butadiene, styrene and methyl isopropenyl ketone, or mechanical blends of polystyrene or the copolymers of styrene previously mentioned with from 1 to 10 percent by weight of natural or the synthetic rubbery copolymers, and copolymers of from 1 to 70 percent by weight of methyl methacrylate and correspondingly from 99 to 30 percent by weight of styrene.

The foamable styrene polymer compositions are prepared in usual ways such as by polymerizing the monomers in mass or in an aqueous suspension such as water or brine in admixture with a volatile organic fluid in which the polymer is insoluble. Alternatively, the volatile organic fluid can be incorporated with the heat-plastified polymer under pressure, e.g. in a plastics extruder, then extruded, cooled and cut to a granular form.

The volatile organic fluid compound employed as foaming agent in the foamable styrene polymer compositions can be a saturated aliphatic hydrocarbon containing from 4 to 7 carbon atoms in the molecule having a molecular weight of at least 58 and boiling at a temperature below 95° C. at atmospheric pressure, i.e. 760 millimeters absolute pressure, or a perchlorofluorocarbon. Suitable foaming agents of this kind are described in U.S. Patent No. 2,848,428.

In practice, the foamable styrene particles can be pressurized with the nitrogen or nitrogen-containing gas, e.g. air, in a suitable pressure resistant vessel while suspended in an inert liquid medium such as water or brine or in the absence of a liquid medium. Water or an aqueous medium is preferred since it tends to avoid the formation of clusters or agglomerates of the polymer particles. In practice of the invention employing an arrangement of apparatus similar to that shown in the drawing, foamable styrene polymer in the form of beads or rounded particles is prepared by polymerizing the monomers, e.g. styrene or a mixture of about 99.93 percent by weight of styrene, 0.03 percent of ethylvinylbenzene and 0.04 percent of divinylbenzene, is polymerized in vessel 1 in admixture with about 8 percent by weight of a volatile fluid organic compound such as petroleum ether (B.p. 30–46° C.) or dichlorodifluoromethane as foaming agent while having the monomers and blowing agent suspended as droplets in an aqueous medium and in the presence of a polymerization catalyst. The polymerization is continued until complete or substantially complete. Thereafter, while maintaining the mixture at temperatures between about 50° and 85° C., the vessel 1 is filled with nitrogen gas or air to a pressure of from 200 to 2000 pounds per square inch gauge pressure. Stirring and heating of the mixture is continued for a time of from 0.5 to 72 hours sufficient to allow the nitrogen gas to substantially impregnate the polymer granules. The mixture is cooled under pressure of said gas until at 25° C. or below. The pressure is released to atmospheric pressure or thereabout. The mixture of the nitrogen gas impregnated polymer particles and the aqueous suspending medium is withdrawn via outlet 5 and is fed onto moving screen belt 6 whereon the aqueous medium is separated and falls into vessel 9 and is passed to waste via outlet 10. The filtered polymer particles on belt 6 are passed under a stream of hot water flowing from conduit 11 and are thereby heated at a temperature of 90°–100° C. for a period of about 30 seconds. The heated polymer beads pass from belt 6 into contact with cold water, e.g. at 25° C. or below in vessel 12 and fed thereto via conduit 14. The slurry of cooled polymer granules and water is withdrawn from vessel 12 via outlet 13 and is fed onto screen belt 15 whereon the polymer particles are separated from the liquid. The water is collected in vessel 18 and is withdrawn to waste via outlet 19. The polymer granules are fed from belt 15 into funnel 17 and onto belts 22, 23 and 24 as they pass through dryer 20 and are discharged from said dryer via funnel 31 into a receiving vessel or container 34. Air at room temperature or thereabout is passed counter current via inlet 32 and vent 33 through dryer 20 to dry or substantially dry the treated foamable styrene polymer particles.

The following example illustrates a way in which the principle of the invention has been applied, but is not to be construed as limiting its scope.

*Example*

A charge of expandable polystyrene consisting of beads of polystyrene having a viscosity characteristic of 18.6 centipoises as determined for a 10 weight percent solution of the polystyrene in toluene at 25° C., and of sizes between 0.8 and 1.5 millimeters diameter and having approximately 7 percent by weight of saturated aliphatic hydrocarbons boiling between about 30° and about 45° C. uniformly dispersed throughout as blowing agent was placed in a stainless steel autoclave, together with an equal volume of water as dispersing medium. The autoclave was closed and filled with nitrogen gas through a valved inlet to a pressure of 700 p.s.i. at room temperature. Thereafter, the autoclave was tumbled end over end and heated in a water bath at a temperature of 80° C. for a period of five hours, then was removed and cooled to 20° C. in cold water. The pressure was released and the autoclave was opened. The polystyrene beads were separated and collected in a wire mesh strainer and were immediately immersed in hot water at a temperature of 95° C. for a period of 30 seconds, then were removed from the hot water and immediately immersed in cold water at a temperature of 25° C. to cool the beads. Portions of the treated polystyrene beads were foamed by heating the same at atmospheric pressure with saturated steam. The treated polystyrene beads foam to a cellular product having a density of 0.04 gram per cubic centimeter of foam and was composed of uniform fine cells of about 0.25 millimeter diameter.

In contrast, when a portion of the expandable polystyrene beads which were not treated as described above, were foamed with steam in the same manner the cellular product was of similar density but was composed of cells of about 0.75 millimeter diameter.

Also, for purpose of comparison, a portion of the nitrogen pressurized beads after cooling under pressure and release of the pressure to atmospheric pressure, but omitting the steps of immersing them in hot water for 30 seconds then cooling them in cold water, was foamed by heating the beads at atmospheric pressure with saturated steam. The cellular product was found to consist of cells of about 0.7 millimeter diameter.

Similar results are obtained by treating expandable styrene polymer particles such as beads or granules of copolymers of styrene and methyl methacrylate, copolymers of at least 70 percent by weight of styrene and not more than 30 percent by weight of alpha-methyl styrene or acrylonitrile, copolymers of from 99.5 to 99.99 percent by weight of styrene and from 0.5 to 0.01 percent by weight of divinylbenzene, copolymers of from 0.5 to 10 percent by weight of natural or a synthetic rubber and from 99.5 to 90 percent by weight of styrene or mechanical blends of from 90 to 99.5 percent by weight of polystyrene and from 10 to 0.5 percent by weight of natural or a synthetic rubber, as herein described.

The term "styrene polymers" employed herein pertains to the normally solid rigid thermoplastic homopolymers and copolymers of monovinyl aromatic compounds of the benzene series of the formula $C_6H_5 \cdot CH=CH_2$ wherein the aromatic or benzene nucleus may be substituted with from one to two alkyl, halogen or alkoxy groups in addition to the vinyl radical, and copolymers or mechanical blends of said aromatic homopolymers and copolymers with natural or a synthetic rubber wherein the vinyl aromatic moiety constitutes at least 70 percent by weight of the styrene polymer starting material to be treated in accordance with the invention.

We claim:
1. A method for treating expandable styrene polymer particles which comprises (a) subjecting discrete particles of a thermoplastic styrene polymer containing a volatile organic fluid having a molecular weight of at least 58 and a boiling point below 95° C. at atmospheric pressure and selected from the group consisting of saturated aliphatic hydrocarbons containing from 4 to 7 carbon atoms and perchlorofluorocarbons, uniformly dispersed throughout in amount corresponding to from 0.03 to 0.5 gram molecular proportion of said volatile organic fluid per 100 grams of said styrene polymer, as expanding agent, to pressure of a gas selected from the group consisting of nitrogen and air at from 200 to 2000 pounds per square inch gauge pressure at temperatures between 50° and 85° C. for a time of from 0.5 to 72 hours sufficient to allow the gas to diffuse substantially throughout the polymer particles, (b) cooling the styrene polymer particles under said pressure to a temperature of at least 25° C., (c) releasing the pressure to atmospheric pressure, and (d) within a period of not more than 5 minutes after release of the pressure to atmospheric pressure contacting the treated polymer particles with hot water at a temperature of from 90° to 100° C. for a time of not more than 30 seconds, then (e) contacting the polymer particles with cold water at a temperature of not more than 25° C.

2. A method according to claim 1, wherein the polymer particles are subjected to pressure of nitrogen gas.

3. A method according to claim 1, wherein the polymer particles are subjected to pressure of air.

4. A method according to claim 1, wherein the styrene polymer is polystyrene.

5. A method according to claim 1, wherein the styrene polymer contains a saturated aliphatic hydrocarbon containing from 4 to 7 carbon atoms in the molecule as expanding agent.

6. A method according to claim 5, wherein the styrene polymer is polystyrene.

References Cited in the file of this patent
UNITED STATES PATENTS
2,884,386    McMillan et al. _____ Apr. 28, 1959